N. NELSON,

Assignor to HOWARD & SCHERRIEBLE.

BUTTON AND STUD.

No. 9,931. Reissued Nov. 15, 1881.

Witnesses

Geo. E. Haynes

Ed Glatzmayer

Inventor

Nels Nelson by his Attorneys

Brown & Brown

N. PETERS, Photo-Lithographer, Washington, D. C.

UNITED STATES PATENT OFFICE.

NELS NELSON, OF PROVIDENCE, RHODE ISLAND, ASSIGNOR TO HOWARD & SCHERRIEBLE, OF SAME PLACE.

BUTTON OR STUD.

SPECIFICATION forming part of Reissued Letters Patent No. 9,931, dated November 15, 1881.

Original No. 234,604, dated November 16, 1880. Application for reissue filed July 14, 1881.

*To all whom it may concern:*

Be it known that I, NELS NELSON, of the city of Providence, and State of Rhode Island, have invented certain new and useful Improvements in Buttons and Studs, of which the following is a specification.

My invention relates to that class of sleeve and collar buttons and studs in which the shoe is hinged to the post, so that it may be turned down parallel therewith to facilitate the insertion of the shoe and post in a button-hole to hold the button in place.

The invention consists in certain novel features in the construction of the shoe and post, and in the manner of securing them together, whereby I greatly simplify the construction as compared with that of other buttons and studs of the same class.

Figure 1:
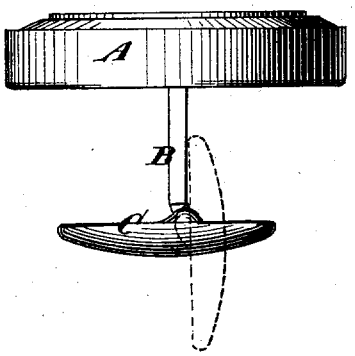
Figure 2:
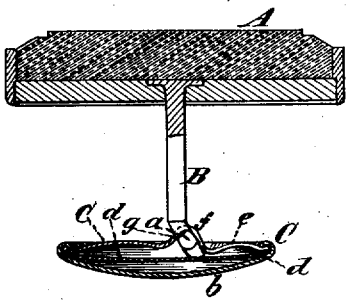
Figure 4:
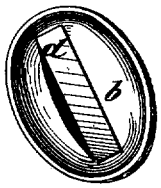
Figure 5:
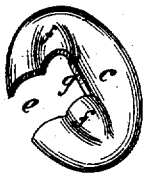
Figure 3:
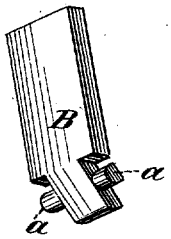

In the accompanying drawings, Figure 1 represents a side view of a button embodying my invention. Fig. 2 represents a vertical section of the button. Fig. 3 represents a perspective view of the post detached from other parts. Fig. 4 represents a perspective view of a cap-plate forming a part of a shoe and of a spring contained therein; and Fig. 5 represents a perspective view of a top plate, also forming part of the shoe.

Similar letters of reference designate corresponding parts in all the figures, and the drawings are made upon an enlarged scale for greater clearness.

A designates the head, B the post, and C the shoe, of a button embodying my improvements.

The post is rigidly fixed to the head in any suitable way, and my invention relates only to the construction of the shoe and post and the manner of securing them together.

The shoe C is hinged to the post upon one side of the center, so that when turned down, as shown in dotted outline in Fig. 1, there will be room enough between the upper edge of the shoe and the head to receive the two or more thicknesses of cloth.

The post B, as most clearly shown in Fig. 3, has upon opposite sides projecting ears or prongs *a*, which are in line with each other and form a pivot, which fits in pivotal bearings in the shoe, and which are formed integral with the post by punching or cutting. The ears *a* are provided with suitable bearings in the shoe C, and the post may be of round, oval, or flat transverse section, the flat form, as here shown, being preferable, as it is of less width and may be more easily inserted through a button-hole when the shoe C is turned down against it.

As will be clearly seen in Fig. 3, the post is bent to one side at the end having the ears or pivot *a*, so that when the shoe is turned down it may come tightly up against the side of the post and be in line or parallel with the post—a result which would not be attained if the ears or pivots *a* were in line with the center of the post.

The shoe C is composed of a cap-plate, *b*, and a top or securing plate, *c*, and between the cap and top plates *b* and *c* is arranged a flat leaf-spring, *d*. The cap-plate *b* has its edge turned up to give it a cup shape. The spring *d* is of a length to fit therein, and the top or securing plate, *c*, is of a diameter to fit therein. The top or securing plate, *c*, has in one side a slot or opening, *e*, wide enough to receive the notched part of the post B just above the ears on pivot *a*, and upon each side of the slot or opening, at the inner end thereof, are outward elevations, forming recesses or depressions *f*, of a size to receive the ears or pivot of the post B, and formed by stamping. At the end *g* of the slot or opening *e* the top or securing plate is deflected slightly to form a stop, and bears against the side of the post B and prevents the shoe from moving past a position at right angles to the post. After inserting the post in the slot or opening *e* in the top or securing plate, *c*, the said plate is placed in the cup-shaped cap-plate *b*, and the edge of the latter is crimped or folded over to secure the several parts of the shoe firmly together. The slot or opening *e* in the top or securing plate, *c*, is of such width that the spring *d* is received within it, and the said spring is prevented from turning in the shoe and retains the ears *a* in the depressions *f*.

The bottom or lower end of the post projects sufficiently beyond the ears or pivot *a* to form a spring-support, and the turning of the shoe from a position parallel with the post and vice versa is resisted by the elasticity of the spring bearing against the end of the post B.

The several parts of the shoe may all be made of light metal, and therefore there is little liability of breaking the dies used in the making thereof.

What I claim as my invention, and desire to secure by Letters Patent, is—

1. In a sleeve-button or stud, the combination, with the post rigidly secured to the head and provided with an integral pivot, of a shoe consisting of a cap-plate, a top plate, and an intermediate spring, the top plate having elevations to receive the pivot, thereby forming a hinge-connection and permitting the shoe to be turned into a position parallel with the post, all substantially as set forth.

2. The combination of the head A, the post B, having ears *a*, and the shoe C, composed of the cap-plate *b*, the top or securing plate, *c*, having a slot or opening, *e*, and depressions or recesses *f*, and the spring *d*, fitting in said slot or opening *e*, substantially as specified.

3. In a sleeve-button or stud, the combination of the top or securing plate, *c*, constructed with outward depressions, *f*, for the reception of the post-pivot, the spring *d*, for holding said pivot in said depressions, and the cap-plate *b*, all substantially as specified.

4. In a sleeve-button or stud, the combination, with the shoe composed of the parts *b*, *d*, and *c*, the latter having elevations *f*, of the post B, bent to one side at the free end, and having pivotal bearings in the shoe, whereby the shoe, when turned in position for insertion, will be substantially parallel with and resting against the post, all substantially as set forth.

5. In a sleeve-button or stud, the combination, with the post B, having its free end bent to one side, and provided with ears *a a*, forming an integral pivot, of the securing-plate *c*, having central elevations, *f f*, adapted to receive said ears *a a* and form a pivotal connection between the post and shoe, all substantially as set forth.

NELS NELSON.

Witnesses:
FRANK H. JACKSON,
B. R. WHEELER.